United States Patent
Norman (10) Patent No.: US 7,298,971 B2
(45) Date of Patent: Nov. 20, 2007

(54) HYBRID OPTICAL RING-MESH PROTECTION IN A COMMUNICATION SYSTEM

(75) Inventor: Charles W. Norman, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 584 days.

(21) Appl. No.: 10/686,372

(22) Filed: Oct. 15, 2003

(65) Prior Publication Data

US 2005/0084263 A1 Apr. 21, 2005

(51) Int. Cl.
*H04B 10/08* (2006.01)

(52) U.S. Cl. ............................... 398/12; 398/3; 398/5

(58) Field of Classification Search ............... 398/1–7, 398/10–17, 19–21
See application file for complete search history.

(56) References Cited

U.S. PATENT DOCUMENTS

| 6,848,006 | B1* | 1/2005 | Hermann | 709/239 |
| 6,968,130 | B1* | 11/2005 | Pan | 398/5 |
| 2002/0095688 | A1* | 7/2002 | Rich | 725/116 |
| 2005/0047713 | A1* | 3/2005 | Antosik | 385/24 |

* cited by examiner

*Primary Examiner*—Dzung Tran (57) ABSTRACT

A communication system includes nodes that exchange communications over optical fibers. In the event of a fault, the nodes implement ring protection for a first set of the communications and implement mesh protection for a second set of the communications. Ring protection may be used for two degree nodes and mesh protection may be used for higher degree nodes, or a customer may select between ring protection and mesh protection.

15 Claims, 5 Drawing Sheets

PRIOR ART

HYBRID OPTICAL RING-MESH PROTECTION IN A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of optical communications, and in particular, to communication systems the provide hybrid ring/mesh protection.

2. Description of the Prior Art

Communication nodes may exchange communications with one another over a work path in an optical ring. If the work path in the optical ring experiences a fault, the nodes may transfer the affected communications over a protect path in the opposite direction around the optical ring. The protect path must have the same capacity as the work path. Unfortunately, the protect path may be much longer than the work path and costly to implement.

Line protection may be used as an alternative to path protection in the optical ring. A work path is typically comprised of a series of work lines that are coupled together to form the work path. These work lines can have corresponding protect lines that are physically or geographically diverse from the work lines. If a work line in the optical ring experiences a fault, the nodes may transfer the affected communications over a corresponding protect line—possibly in the opposite direction around the optical ring. The protect line must have the same capacity as the work line. Unfortunately, the protect line may be much longer than the work line and costly to implement.

Both path protection and line protection in an optical ring are referred to below as ring protection.

Communication nodes may also exchange communications with one another over links in an optical mesh. If a link in the optical mesh experiences a fault, the nodes re-route the affected communications through the optical mesh around the fault. Unfortunately, the mesh protection may be slower than ring protection.

Ring protection and mesh protection have not been effectively integrated into a hybrid protection system.

SUMMARY OF THE INVENTION

The invention helps solve the above problems by effectively integrating ring protection and mesh protection into a hybrid protection system.

Some examples of the invention include a communication system that comprises a. plurality of optical fibers, a plurality of Point of Presence (POP) nodes coupled to the optical fibers, and a plurality of switch nodes coupled to the optical fibers. The POP nodes are configured to exchange communications with external systems. The switch nodes are configured to exchange the communications with the POP nodes and to exchange the communications with one another. In the event of a fault, the POP nodes and the switch nodes are configured to implement ring protection for the communications between the POP nodes and the switch nodes and to implement mesh protection for the communications between the switch nodes.

Some examples of the invention include a communication system that comprises a plurality of optical fibers, a plurality of two degree nodes coupled to the optical fibers, and a plurality higher degree nodes coupled to the optical fibers. The two degree nodes and the higher degree nodes are configured to exchange communications. In the event of a fault, the two degree nodes and higher degree nodes are configured to implement ring protection for the communications with the two degree nodes and to implement mesh protection for the communications between the higher degree nodes.

Some examples of the invention include a communication system that comprises a plurality of optical fibers and a plurality of nodes coupled to the optical fibers. The nodes are configured to exchange communications, and in the event of a fault, the nodes are configured to implement ring protection for a first set of the communications and to implement mesh protection for a second set of the communications. A communication system customer selects the first set of the communications for the ring protection and selects the second set of the communications for the mesh protection.

BRIEF DESCRIPTION OF THE DRAWINGS

The same reference number represents the same element on all drawings.

DETAILED DESCRIPTION OF THE PREFERRED EMBODIMENT

Figure 1:
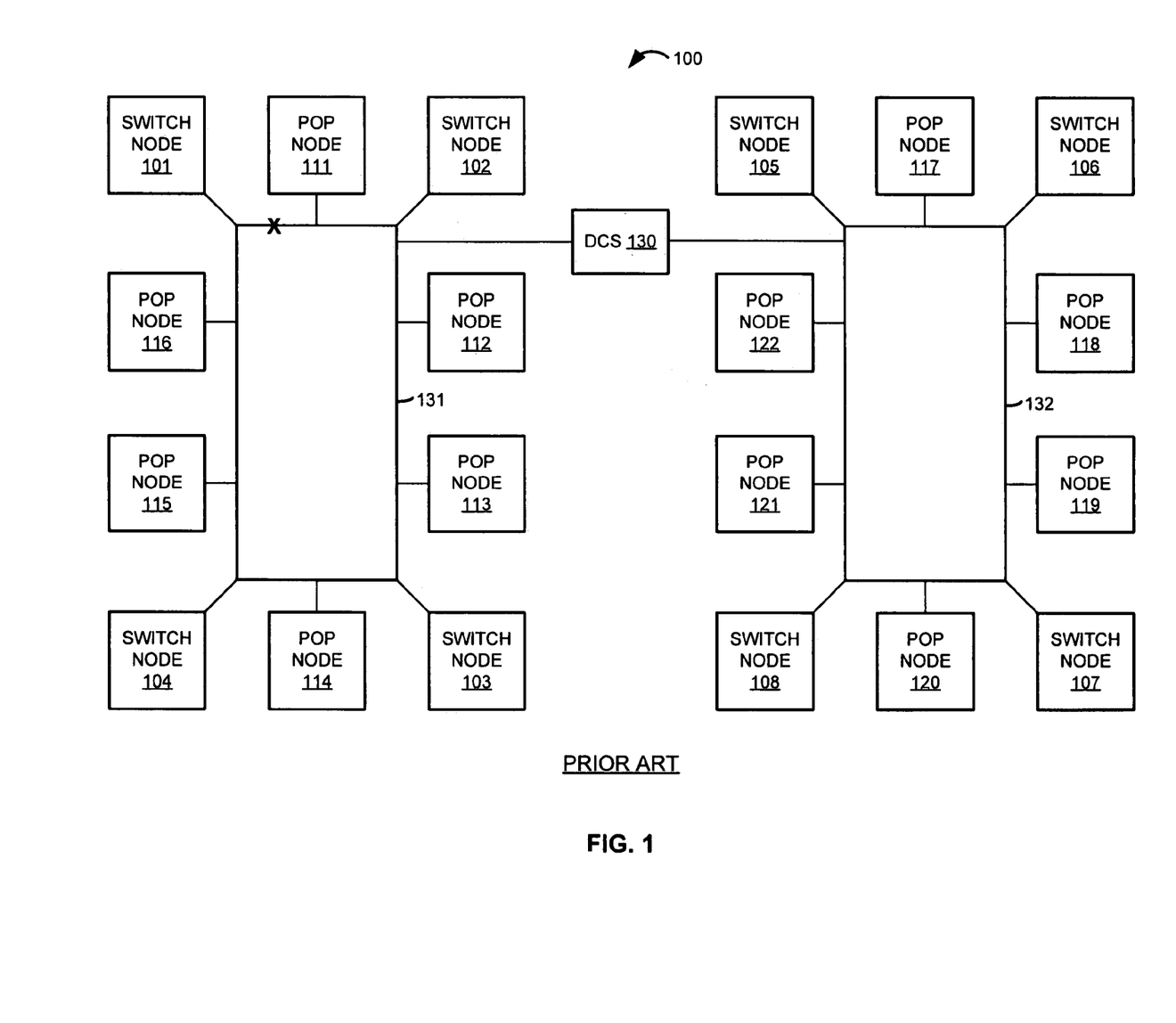
FIG. 1 illustrates a communication system in an example of the prior art.
Figure 2:
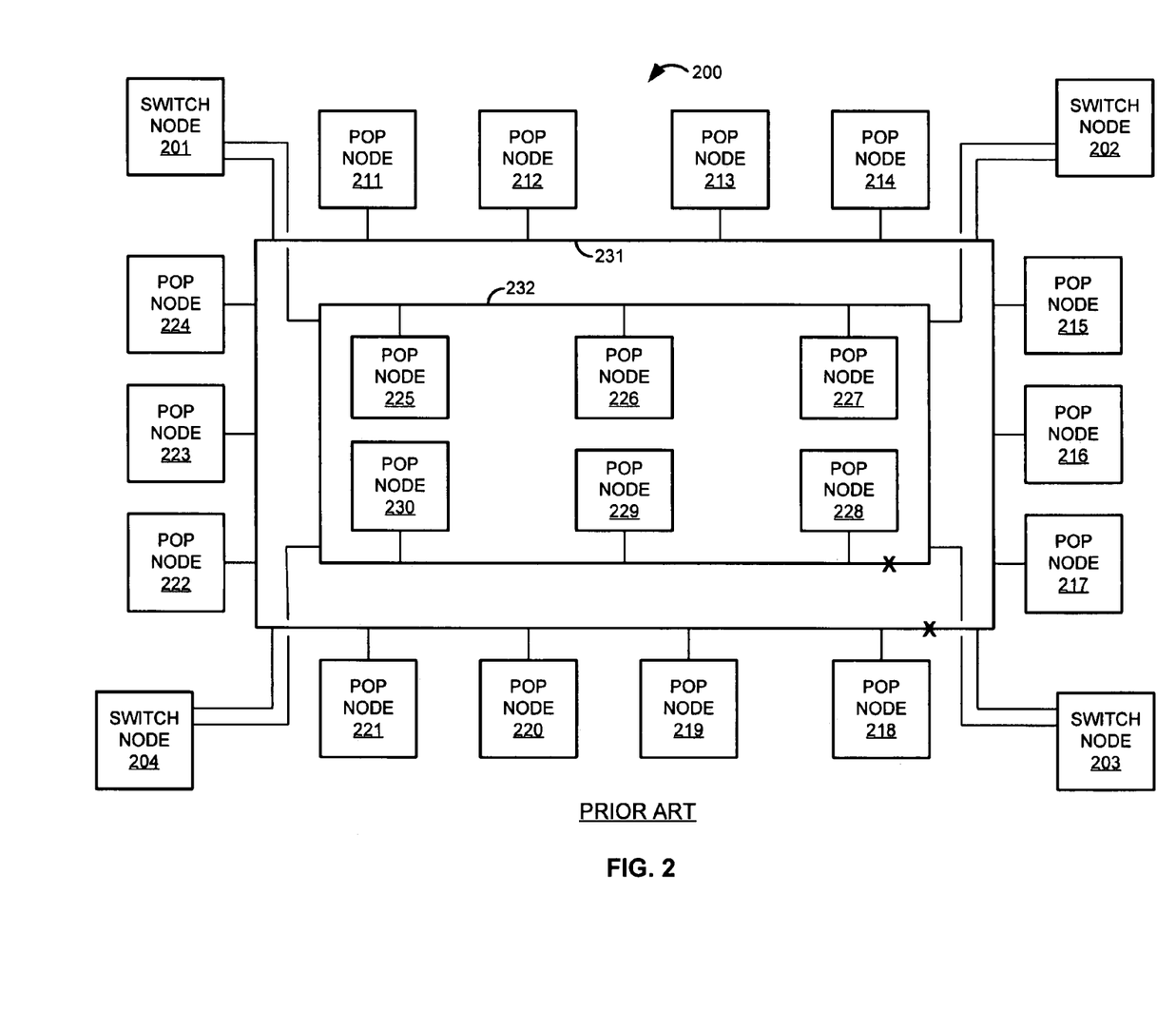
FIG. 2 illustrates a communication system in an example of the prior art.

Prior Communication Systems—FIGS. 1-2

A brief discussion of a prior communication system is first provided to facilitate a better understanding of the invention. FIG. 1 illustrates communication system 100 in an example of the prior art. Communication system 100 includes switch nodes 101-108, Point-of-Presence (POP) nodes 111-122, optical rings 131-132, and Digital Cross-Connect (DCS) 130. Switch nodes 101-104 and POP nodes 111-116 are connected to optical ring 131. Switch nodes 105-108 and POP-nodes 117-122 are connected to optical ring 132. Optical ring 131 is coupled to optical ring 132 by DCS 130.

Optical rings 131-132 are comprised of optical fibers where rings 131-132 could each use one or more optical wavelengths within the optical fibers. POP nodes 111-122 could each comprise a Synchronous Optical Network (SONET) Add/Drop Multiplexer (ADM) that is coupled to optical rings 131-132. Switch nodes 101-108 could each comprise a SONET ADM that is coupled to optical rings 131-132 and a class 4 telephone switching system that is coupled to the SONET ADM.

POP nodes 111-122 exchange communications with systems that are external to communication system 100. POP nodes 111-122 exchange these communications with switch nodes 101-108. In some examples, communication system 100 is a long distance telephone network, and POP nodes 111-122 exchange the communications with local telephone networks and business enterprise networks. Thus, POP nodes 111-122 provide access to communication network 100.

POP nodes 111-122 are individually homed to switch nodes 101-108. Homing means that a particular POP node exchanges its traffic with a particular home switch node. To home POP nodes 111-122 to switch nodes 101-108, bidirectional connections are established between individual POP nodes and individual home switch nodes through optical rings 131-132.

In this example, path protection is used, but line protection could be used as an 10 alternative. A work path and a protect path are established between each POP node and home switch node around opposite sides-of the optical ring. Thus, each POP node is homed to a switch node on the same optical ring by a geographically diverse work path and protect path. POP nodes 111-122 are homed to switch nodes 101-108 as indicated in the following table.

| POP NODE | HOME SWITCH NODE |
| --- | --- |
| POP NODE 111 | SWITCH NODE 101 |
| POP NODE 112 | SWITCH NODE 102 |
| POP NODE 113 | SWITCH NODE 103 |
| POP NODE 114 | SWITCH NODE 104 |
| POP NODE 115 | SWITCH NODE 104 |
| POP NODE 116 | SWITCH NODE 101 |
| POP NODE 117 | SWITCH NODE 106 |
| POP NODE 118 | SWITCH NODE 106 |
| POP NODE 119 | SWITCH NODE 107 |
| POP NODE 120 | SWITCH NODE 107 |
| POP NODE 121 | SWITCH NODE 108 |
| POP NODE 122 | SWITCH NODE 105 |

Switch nodes 101-108 exchange communications with POP nodes 111-122, and exchange these communications with one another. If communication system 100 is a long distance telephone network, an originating switch node that receives a call into network 100 selects the terminating switch node that will transfer the call from network 100. The originating switch node exchanges call communications with the terminating switch node. The originating and terminating switch nodes exchange these call communications with their respective POP nodes to complete the call path through network 100. Thus, switch nodes 101-108 route user communications through communication network 100.

To perform the routing, each switch node has a bidirectional connection to other switch nodes for-switch-to-switch communications. Between two switch nodes, the connection includes a geographically diverse work path and protect path around opposite sides of the optical rings. These connections between switch nodes 101-108 are established through DCS 130 and optical rings 131-132.

Consider a telephone call where a caller will exchange communications with POP node 115, and the called party will exchange communications with POP node 120. During call set-up, the originating switch node 104 processes the called number to select terminating switch node 107. During the call, POP node 115 exchanges communications between the caller and switch node 104. POP node 120 exchanges the communications between the called party and switch node 107. Switch node 104 exchanges the communications with switch node 107. Without a fault, the work paths are used for the call.

If an optical ring experiences a fault, the nodes transfer the affected communications from the work path to the protect path. Thus, the communications are re-routed around the other side of the faulty optical ring. For example, if optical ring 131 is cut between switch node 101 and POP node 111 as indicated by the X mark on FIG. 1, then nodes 101 and 111 re-route their communications over the protect path in the opposite direction around optical ring 131. Likewise during the fault, switch nodes 101 and 105 may re-route their communications over their protect path in the opposite direction around optical ring 131.

Note that communication system 100 uses ring protection for both POP-to-switch communications and switch-to-switch communications.

FIG. 2 illustrates communication system 200 in another example of the prior art. Communication system 200 could be similar to communication system 100 in various aspects, but communication system 200 has a different ring architecture from communication system 100. Communication system 200 includes switch nodes 201-204, POP nodes 211-230, and optical rings 231-232. Switch nodes 201-204 and POP nodes 211-224 are connected to optical ring 231. Switch nodes 201-204 and POP nodes 225-230 are connected to optical ring 232.

Communication system 200 is an example of stacked rings. Optical rings 231-232 are stacked because optical ring 231 cannot effectively handle additional POP nodes 225-230, so another optical ring 232 is added to handle additional POP nodes 225-230. All switch nodes 201-204 are connected to both stacked rings 231-232.

POP nodes 211-230 are individually homed to switch nodes 201-208 over bidirectional connections that are established between individual POP nodes and individual home switch nodes through optical rings 231-232. Between each POP node and home switch node, a work path and a protect path are established around opposite sides of the optical ring. POP nodes 211-230 are homed to switch nodes 201-204 as indicated in the following table.

| POP NODE | HOME SWITCH NODE |
| --- | --- |
| POP NODE 211 | SWITCH NODE 201 |
| POP NODE 212 | SWITCH NODE 201 |
| POP NODE 213 | SWITCH NODE 202 |
| POP NODE 214 | SWITCH NODE 202 |
| POP NODE 215 | SWITCH NODE 202 |
| POP NODE 216 | SWITCH NODE 202 |
| POP NODE 217 | SWITCH NODE 203 |
| POP NODE 218 | SWITCH NODE 203 |
| POP NODE 219 | SWITCH NODE 203 |
| POP NODE 220 | SWITCH NODE 204 |
| POP NODE 221 | SWITCH NODE 204 |
| POP NODE 222 | SWITCH NODE 204 |
| POP NODE 223 | SWITCH NODE 201 |
| POP NODE 224 | SWITCH NODE 201 |
| POP NODE 225 | SWITCH NODE 201 |
| POP NODE 226 | SWITCH NODE 201 |
| POP NODE 227 | SWITCH NODE 202 |
| POP NODE 228 | SWITCH NODE 203 |
| POP NODE 229 | SWITCH NODE 203 |
| POP NODE 230 | SWITCH NODE 204 |

In this example, path protection is used, but line protection could be used as an alternative. Each switch node has a bidirectional connection to every other switch node for switch-to-switch communications. Between two switch nodes, the connection includes a geographically diverse work path and protect path around opposite sides of the optical rings. The connections between switch nodes 201-204 are established through optical rings 231-232.

Consider a telephone call where a caller will exchange communications with POP node 211, and the called party will exchange communications with POP node 228. During call set-up, the originating switch node 201 processes the called number to select terminating switch node.203. During the call, POP node 211 exchanges communications between the caller and switch node 201. POP node 228 exchanges the communications between the called party and switch node 203. Switch node 201 exchanges the communications with switch node 203. Without a fault, the work paths are used for the call.

If an optical ring experiences a fault, then the nodes transfer the affected communications from the work path to the protect path. Thus, the communications are re-routed around the other side of the faulty optical ring. For example, if optical rings 231-232 are cut between switch node 203 and POP nodes 218 and 228 as indicated by the X marks on FIG. 2, then nodes 203 and 228 re-route their communications over the protect path in the opposite direction around optical ring 232. Likewise during the fault, switch nodes 201 and 205 re-route their communications over their protect path in the opposite direction around optical ring 231.

Path-based ring protection requires end-to-end protect paths between POP nodes and switch nodes and between switch nodes and switch nodes. Unfortunately, restoration by re-routing over a protect path around the opposite side of a ring can be inefficient and expensive. If two neighboring switch nodes on a ring exchange a high traffic volume over their short work path, then an equally high capacity protect path, which is typically much longer, must be established all the way around the other side of the ring.

For example, consider an optical ring that traverses the eastern United States along the following route—New York—Washington DC—Atlanta—Dallas—Chicago—New York. If a network customer requires a large amount of bandwidth between their sites in Washington DC and New York, the ring must be upgraded to provide a high-capacity work path between Washington DC and New York. Unfortunately, the ring must also be upgraded to provide a high-capacity protect path over the longer route through Atlanta, Dallas, and Chicago.

Figure 3:
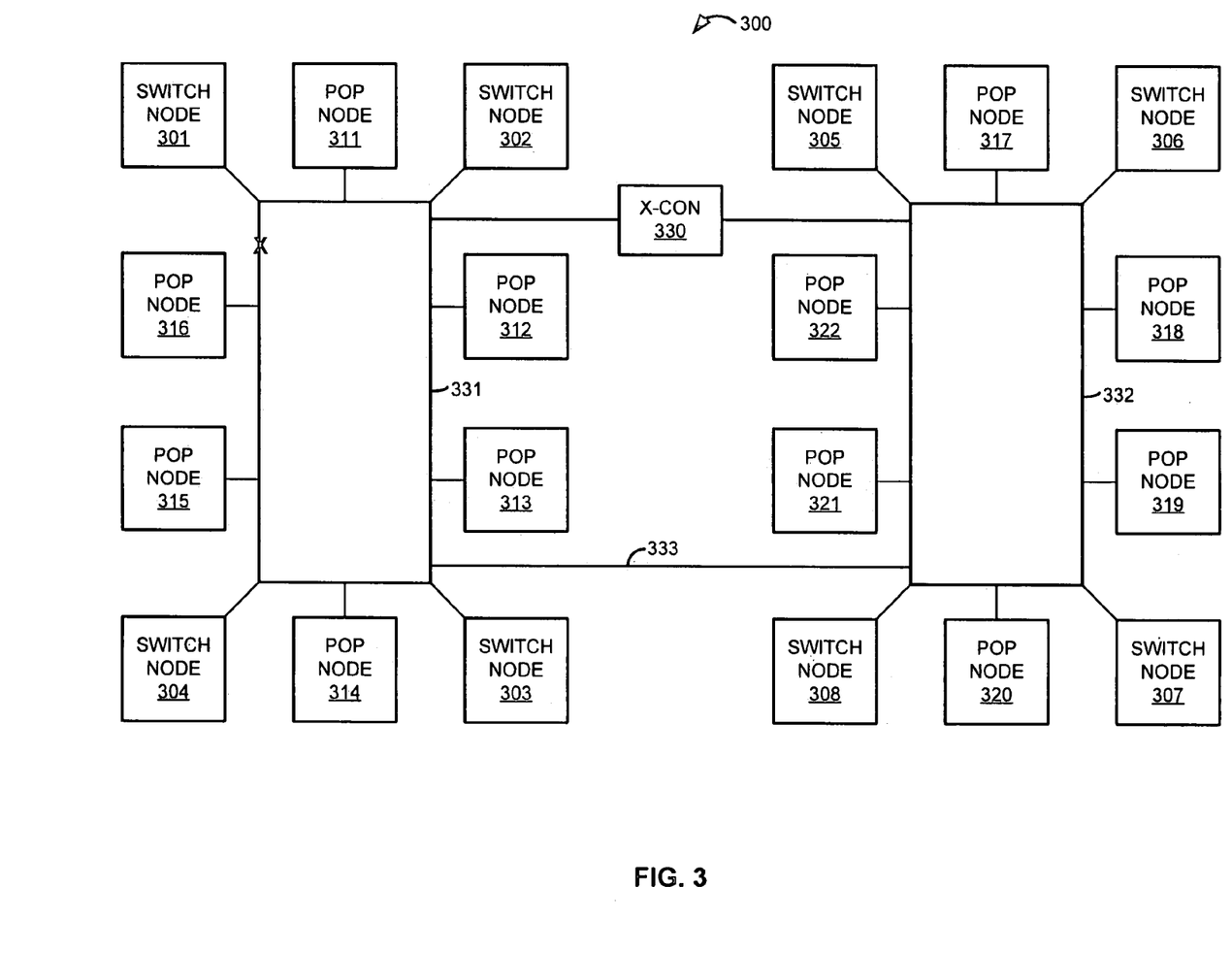
FIG. 3 illustrates a communication system in an example of the invention.
Figure 4:
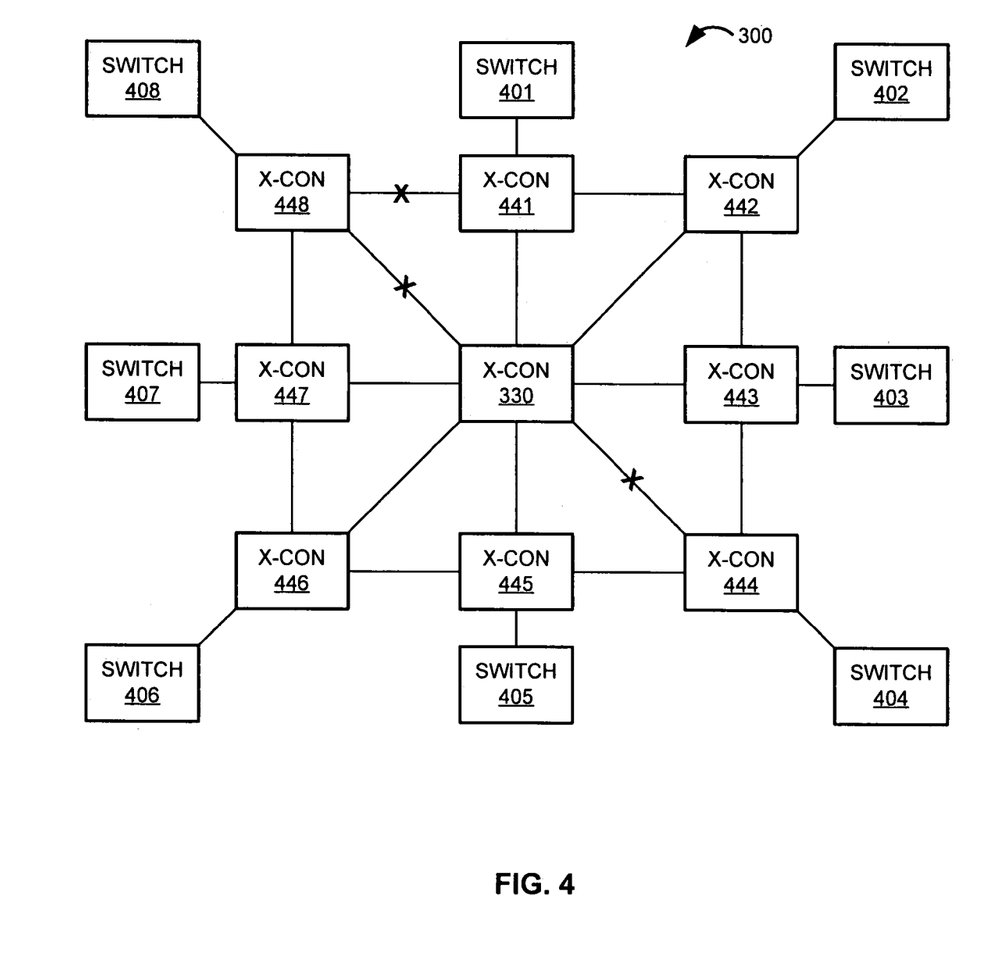
FIG. 4 illustrates the communication system of FIG. 3 in an example of the invention.
Figure 5:
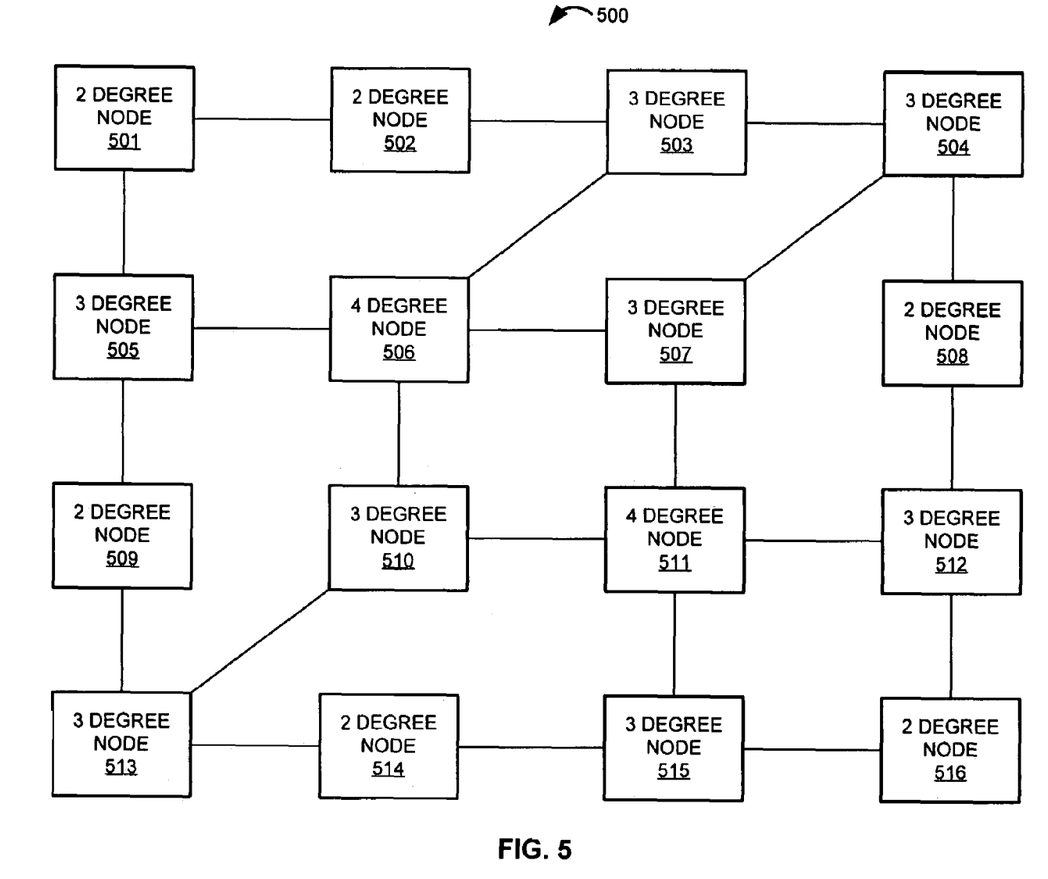
FIG. 5 illustrates a communication system in an example of the invention.

New Communication System Configuration and Operation—FIGS. 3-5

FIGS. 3-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

FIG. 3 illustrates communication system 300 in an example of the invention. Communication system 300 includes switch nodes 301-308, POP nodes 311-322, cross-connect (X-CON on FIG. 3-4) 330, optical rings 331-332, and optical link 333. Switch nodes 301-304 and POP nodes 311-316 are connected to optical ring 331. Switch nodes 305-308 and POP nodes-317-322 are connected to optical ring 332. Optical ring 331 is coupled to optical ring 332 by cross-connect 330 and by optical link 333.

Cross-connect 330 could be optical or electrical. Optical rings 331-332 are comprised of optical fibers where rings 331-332 could each use one or more optical wavelengths within the optical fibers. POP nodes 311-322 could each comprise a SONET ADM that is coupled to optical rings 331-332. Switch nodes 301-308 could each comprise a SONET ADM and cross-connect that is coupled to optical rings 131-132 and a switching system that is coupled to the SONET ADM and cross-connect. The switching system could be a class 4 switch, class 5 switch, internet protocol router, asynchronous transfer mode switch, frame relay switch, multi-protocol label switch, or some other type of switching system.

POP nodes 311-322 exchange communications with systems that are external to communication system 300. POP nodes 311-322 exchange these communications with switch nodes 301-308. In some examples, communication system 300 is a long-distance telephone network, and POP nodes 311-322 exchange the communications with local telephone networks and business enterprise networks. Thus, POP nodes 311-322 provide access to communication network 300.

POP nodes 311-322 are individually homed to switch nodes 301-308. To home POP nodes 311-322 to switch nodes 301-308, bidirectional connections are established between individual POP nodes and individual home switch nodes through optical rings 331-332. Path protection is used in this example, so a work path and a protect path are established between each POP node and home switch node around opposite sides of the optical ring. Thus, each POP node is homed to a switch node on the same optical ring by physically or geographically diverse work and protect paths. Alternatively, line protection could be used instead of path protection—where both path and line protection are referred to as ring protection. POP nodes 311-322 are homed to switch nodes 301-308 as indicated in the following table.

| POP NODE | HOME SWITCH NODE |
| --- | --- |
| POP NODE 311 | SWITCH NODE 301 |
| POP NODE 312 | SWITCH NODE 302 |
| POP NODE 313 | SWITCH NODE 303 |
| POP NODE 314 | SWITCH NODE 304 |
| POP NODE 315 | SWITCH NODE 304 |
| POP NODE 316 | SWITCH NODE 301 |
| POP NODE 317 | SWITCH NODE 306 |
| POP NODE 318 | SWITCH NODE 306 |
| POP NODE 319 | SWITCH NODE 307 |
| POP NODE 320 | SWITCH NODE 307 |
| POP NODE 321 | SWITCH NODE 308 |
| POP NODE 322 | SWITCH NODE 305 |

Switch nodes 301-308 exchange communications with POP nodes 311-322 and exchange these communications with one another. If communication system 300 is a long distance telephone network, an originating switch node that receives a call into network 300 selects the terminating switch node that will transfer the call from network 300. The originating switch node exchanges call communications with the terminating switch node. The originating and terminating switch nodes exchange these call communications with their respective POP nodes to complete the call path.

Thus, switch nodes 301-308 route user communications through communication network 300. To perform the routing, each switch node has a bidirectional connection to other switch nodes for switch-to-switch communications.

FIG. 4 illustrates switch-to-switch connections for communication system 300 in an example of the invention. For clarity, POP nodes 311-322, switch nodes 301-308, optical rings 331-332, and optical link 333 are not indicated on FIG. 4. Instead, FIG. 4 shows switches 401-408 and cross-connects 441-448 that respectively comprise switch nodes 301-308. Optical fibers within optical rings 331-332 and optical link 333 are used to interconnect cross-connects 330, 441-448, and in some cases, optical wavelengths within the optical fibers are used for these links.

The connection between two cross-connects is referred to as a link, and the links that connect two switches are referred to as a connection. Note that not all of the links need to traverse the optical rings—some cross-connect-to-cross-connect or cross-connect-to-switch links may use optical fibers that are geographically diverse from the optical ring. Cross-connects 330, 441-448 are interconnected by links to form a mesh network as indicated in the following table.

| CROSS-CONNECT | CROSS-CONNECT |
| --- | --- |
| CROSS-CONNECT 441 | CROSS-CONNECT 330 |
| CROSS-CONNECT 441 | CROSS-CONNECT 442 |
| CROSS-CONNECT 441 | CROSS-CONNECT 448 |
| CROSS-CONNECT 442 | CROSS-CONNECT 330 |
| CROSS-CONNECT 442 | CROSS-CONNECT 443 |
| CROSS-CONNECT 443 | CROSS-CONNECT 330 |
| CROSS-CONNECT 443 | CROSS-CONNECT 443 |
| CROSS-CONNECT 444 | CROSS-CONNECT 330 |
| CROSS-CONNECT 444 | CROSS-CONNECT 445 |
| CROSS-CONNECT 445 | CROSS-CONNECT 330 |
| CROSS-CONNECT 445 | CROSS-CONNECT 446 |
| CROSS-CONNECT 446 | CROSS-CONNECT 330 |
| CROSS-CONNECT 446 | CROSS-CONNECT 447 |
| CROSS-CONNECT 447 | CROSS-CONNECT 330 |
| CROSS-CONNECT 447 | CROSS-CONNECT 448 |

Each switch node has a bidirectional connection to other switch nodes for switch-to-switch communications. The connections are established through cross-connects 330 and 441-448 over their respective links. Note that geographically diverse work and protect paths around opposite sides of the optical rings are not required to interconnect switch nodes. In the event of a fault, cross-connects 330 and 441-448 re-route switch-to-switch traffic through the mesh links around the fault.

Referring to both FIGS. 3 and 4, consider a telephone call where a caller will exchange communications with POP node 316, and the called party will exchange communications with POP node 320. During call set-up, originating switch node 301 processes the called number to select terminating switch node 307. During the call, POP node 316 exchanges communications between the caller and switch node 301. POP node 320 exchanges the communications between the called party and switch node 307. Switch node 301 exchanges the communications with switch node 307. Without a fault, the work paths are used for the call communications between POP node 316 and switch node 301 and between POP node 320 and switch node 307. The cross-connect links are used for the call communications between switch node 301 and switch node 307.

If optical ring 331 experiences a fault between POP node 316 and switch node 301 as indicated by the X mark on FIG. 3, then nodes 301 and 316 transfer their communications from their work path to their protect path. Thus, the POP-to-switch communications use ring protection to re-route communications around the other side of faulty optical ring 331.

Unlike some prior art systems, switch-to-switch communications are not re-routed over a protect path in the opposite direction on ring 33 1. As indicated on FIG. 4 by X marks, the fault on ring 331 disrupts communications between cross-connect 441 and cross-connect 448, between cross-connect 330 and cross-connect 448, and between cross-connect 330 and cross-connect 444.

On the call, switch 401 of node 301 exchanges communications with switch 407 of node 307. Because of the mesh, cross-connect 441 and cross-connect 447 have multiple links that may be used to re-route these switch-to-switch communications around the fault between switches 401 and 407. One-half of the affected communications could be re-routed by cross-connect 441 and 447 through cross-connect 330. The other half of the affected communications could be re-routed by cross-connect 441 and 447 through cross-connect 442-446.

Thus, in the event of a fault, POP-to-switch communications affected by the fault are re-routed using ring protection. Switch-to-switch communications that are affected by the fault are re-routed using mesh protection. Ring protection and mesh protection may be wavelength based or sub-wavelength based. The hybrid ring/mesh protection described above is fully applicable to stacked rings as well.

Advantageously, mesh protection between switch nodes does not require inefficient and lengthy protect paths around the other side of a ring because mesh protection may be distributed among multiple shorter links that can be shared. If a particular work path requires a large capacity upgrade, then the mesh protection for the work path may be implemented over multiple links without the need to build a large and lengthy protect path.

Mesh protection could be based on many factors. Links that form a protect connection with latency that is low enough to avoid echo cancellation may be preferred. If the faulty link has a particular class-of-service, then links that form a protect connection that maintains the class-of-service may be preferred. Links that form a protect connection with latency that is low enough to maintain a service level agreement may be preferred. Links that form a protect connection with latency that is low enough to support the requirements a specific protocol being used may be preferred.

Hybrid ring/mesh protection could be selected by the customer based on need and cost. Ring protection has the fastest restoration but costs the more. Mesh protection could be broken into two classes—planned and best effort. Planned mesh protection uses links that are pre-selected for the given fault condition to build the protect connection. Planned mesh protection is relatively fast and is cheaper than ring protection. Best effort mesh protection assesses the fault condition after the fault-to select the best available links to build the protect connection. Best-effort mesh protection offers the slowest and cheapest restoration.

For example, a customer may desire expensive ring protection for a critical connection because of better restoration speed. The customer may desire planned mesh protection for an important connection because the restoration is fast enough, but the higher cost of ring protection is avoided. The customer may desire best-effort mesh protection for less important connections because the restoration is adequate and saves more money.

EXAMPLE #2

FIG. 5 illustrates communication system 500 in an example of the invention. Communication system 500 includes nodes 501-516. Nodes 501-516 exchange communications with one another and possibly with other systems. Nodes 501-516 are labeled 2 degree, 3 degree, or 4 degree based on whether they are connected to two, three, or four links. For example, node 501 is a two degree node because it is connected to two links, node 507 is a three degree node because it is connected to three links, and node 511 is a four degree node because it is connected to four links. The three and four degree nodes are referred to as higher degree nodes and could include nodes with degrees higher than four.

Nodes 501-505 could be similar to the POP and switch nodes described above. Nodes 501-505 could also be other communication nodes, such as routers, service platforms, gateways, or other communications equipment. Nodes 501-505 are interconnected by links as indicated in the following table.

| NODE | DEGREE | CONNECTED TO NODES |
|------|--------|--------------------|
| 501 | 2 | 502, 505 |
| 502 | 2 | 501, 503 |
| 503 | 3 | 502, 504, 506 |
| 504 | 3 | 503, 507, 508 |
| 505 | 3 | 501, 506, 509 |
| 506 | 4 | 503, 505, 507, 510 |
| 507 | 3 | 504, 506, 511 |
| 508 | 2 | 504, 512 |
| 509 | 2 | 505, 513 |
| 510 | 3 | 506, 511, 513 |
| 511 | 4 | 507, 510, 512, 515 |
| 512 | 3 | 508, 511, 516 |
| 513 | 3 | 509, 510, 514 |
| 514 | 2 | 513, 515 |
| 515 | 3 | 511, 514, 516 |
| 516 | 2 | 512, 515 |

Two degree nodes 501, 502, 508, 509, 514, and 516 are connected to an optical ring. Higher degree nodes 503, 504, 505, 506, 507, 510, 511, 512, 513, and 515 are connected to an optical mesh and possibly to the optical ring. The two degree nodes are connected to the other nodes over the optical rings with work and protect paths or lines. Thus, the higher degree nodes are connected to the two degree nodes over these work and protect paths or lines. The higher degree nodes are connected to the other higher degree nodes over the optical mesh.

In the event of a fault, nodes communicating over the optical ring transfer their affected communications over the protect path or line in the optical ring. Nodes communicating over the optical mesh re-route their affected communications around the fault, through the mesh. Thus, communications with two degree nodes are ring protected. Communications between higher degree nodes and not with two degree nodes are mesh protected.

In the first example given above, the POP nodes were two degree nodes and the switch nodes were three degree nodes. Thus, the POP-to-switch communications were ring protected and the switch-to-switch communications were mesh protected.

In a variation to this example, select communications between three and four degree nodes could be ring protected instead of mesh protected. In this way, the various classes of protection could be selected by the customer for implementation by communication system 500.

For example, in the event of a fault, nodes 501-516 could implement ring protection for a first set of communications and implement mesh protection for a second set of communications. The customer of the communication system could select the first set of the communications for the ring protection and select the second set of the communications for the mesh protection. Typically, the ring protection would be more expensive than the mesh protection. In addition, the mesh protection may use links pre-planned for the fault for a first portion of the second set of communications and use links selected after the fault for a second portion of the second set of communications. Typically, the mesh protection using the pre-planned links is more expensive than the mesh protection using links selected after the fault.

Mesh protection could also use a hierarchy approach where a pre-planned protection scheme for the specific fault condition is implemented, first (static mesh protection), but if there is no pre-planned protection scheme for the specific fault condition, then an algorithm can be used to dynamically assess the fault to devise and implement a protection scheme (dynamic mesh protection).

Hybrid ring mesh protection could also use a hierarchy where ring protection is used first. If ring protection is not available, then static mesh protection is used. If static mesh protection is not available, then dynamic mesh protection is used.

The invention claimed is:

1. A communication system comprising:
   a plurality of optical fibers;
   a plurality of Point of Presence (POP) nodes coupled to the optical fibers and configured to exchange communications with external systems; and
   a plurality of switch nodes coupled to the optical fibers and configured to exchange the communications with the POP nodes and to exchange the communications with one another, and wherein in the event of a fault, the POP nodes and the switch nodes are configured to implement ring protection for the communications between the POP nodes and the switch nodes and to implement mesh protection for the communications between the switch nodes.

2. The communication system of claim 1 wherein the POP nodes and the switch nodes are configured to implement the ring protection by re-routing an affected portion of the communications over a protect path or line around an optical ring in the opposite direction of a work path or line, and wherein the switch nodes are configured to implement the mesh protection by re-routing the affected portion of the communications around the fault through an optical mesh.

3. The communication system of claim 1 wherein the communication system comprises a long distance network and the external systems include a local telephone network.

4. The communication system of claim 1 wherein the switch nodes are configured to process telephone numbers to route telephone calls over the optical fibers.

5. The communication system of claim 1 wherein the POP nodes exchange the communications over stacked optical rings within the optical fibers.

6. The communication system of claim 1 wherein the mesh protection is based on links that can be connected to form a protect connection with latency that is low enough to avoid echo cancellation.

7. The communication system of claim 1 wherein the mesh protection is based on links that can be connected to form a protect connection that maintains a class-of-service of a faulty link.

8. A communication system comprising:
a plurality of optical fibers;
a plurality of two degree nodes coupled to the optical fibers and configured to exchange communications; and
a plurality higher degree nodes coupled to the optical fibers and configured to exchange the communications, and wherein in the event of a fault, the two degree nodes and higher degree nodes are configured to implement ring protection for the communications with the two degree nodes and to implement mesh protection for the communications between the higher degree nodes.

9. The communication system of claim 8 wherein the two degree nodes are configured to implement the ring protection by re-routing affected portions of the communications over a protect path or line around an optical ring in the opposite direction of a work path or line, and wherein the higher degree nodes are configured to implement the mesh protection by re-routing the affected portion of the communications around the fault through an optical mesh.

10. The communication system of claim 8 wherein the two degree nodes exchange the communications over stacked optical rings within the optical fibers.

11. The communication system of claim 8 wherein the mesh protection is based on links that can be connected to form a protect connection with latency that is low enough to avoid echo cancellation.

12. The communication system of claim 8 wherein the mesh protection is based on links that can be connected to form a protect connection that maintains a class-of-service of a faulty link.

13. The communication system of claim 8 wherein the mesh protection uses links pre-planned for the fault.

14. The communication system of claim 8 wherein the mesh protection uses links selected after the fault.

15. The communication system of claim 8 wherein additional communications between the higher degree nodes is ring protected.

* * * * *